(12) United States Patent
Rohrer et al.

(10) Patent No.: US 6,670,292 B2
(45) Date of Patent: Dec. 30, 2003

(54) CONTAINER FOR HIGH-GRADE NATURAL PRODUCTS

(75) Inventors: Marcus Rohrer, Merksplas (BE); Yves Kraushaar, Olten (CH)

(73) Assignee: Viosol B.V. (NL)

( * ) Notice: Subject to any disclaimer, the term of this patent is extended or adjusted under 35 U.S.C. 154(b) by 143 days.

(21) Appl. No.: 09/761,385

(22) Filed: Jan. 16, 2001

(65) Prior Publication Data

US 2002/0045016 A1 Apr. 18, 2002

(30) Foreign Application Priority Data

Oct. 12, 2000 (NL) .............................. 1016392

(51) Int. Cl.[7] .............................. C03C 3/087
(52) U.S. Cl. .......................... 501/71; 501/70
(58) Field of Search ............... 801/27, 70, 71

(56) References Cited

U.S. PATENT DOCUMENTS

| | | | | |
|---|---|---|---|---|
| 1,411,133 A | * | 3/1922 | Tayler | 501/60 |
| 1,411,134 A | * | 3/1922 | Taylor | 501/27 |
| 2,693,422 A | | 11/1954 | Duncan et al. | |
| 5,612,263 A | | 3/1997 | Filmer et al. | |

FOREIGN PATENT DOCUMENTS

| | | |
|---|---|---|
| DE | 493857 | 2/1930 |
| DE | 2144106 | 9/1972 |
| DE | 19532800 | 2/1997 |
| DE | 19532807 | 2/1997 |
| FR | 500262 | 3/1920 |
| GB | 263410 | 12/1926 |
| GB | 430387 | 6/1935 |
| JP | 8283038 | 10/1996 |
| JP | 09-188542 | * 7/1997 |
| RU | 2045486 | * 10/1995 |
| SU | 1694495 | * 11/1991 |

OTHER PUBLICATIONS

Machine translation of JP 09–188542.*
Derwent Abstract of RU 2,045,486.*
Derwent Abstract of SU 1,694,495.*
O'Bannon, Loran S., Dictionary of Ceramic Science and Engineering, 1984, Plenum Press, p. 181.*
Natura et al., Formation of radiation defects in silicate and borosilicate glasses caused by UV lamp and excimer laser irradiation, Sep. 1999, Glass Science and Technology, pp. 295–301.

* cited by examiner

*Primary Examiner*—David Sample
*Assistant Examiner*—Elizabeth A. Bolden
(74) *Attorney, Agent, or Firm*—Webb Ziesenheim Logsdon Orkin & Hanson, P.C.

(57) ABSTRACT

The present invention relates to a container for high-grade natural products and a glass composition for such a container. Natural products, such as natural dietary supplements, phyto-therapeutic agents, etheric oils or homeopathic medicines, are high-grade products and can be stored in such a container. The container is made of clear glass in which the composition of the glass has incorporated therein particular mineral oxides including at least aluminum oxide, silicon oxide, sodium oxide, potassium oxide, magnesium oxide, calcium oxide, cobalt oxide, nickel oxide, manganese oxide, chromium oxide, iron oxide, and titanium oxide, such that the glass is capable of substantially blocking visible light but allowing for the transmittance of ultraviolet and infrared light.

10 Claims, 3 Drawing Sheets

CONTAINER FOR HIGH-GRADE NATURAL PRODUCTS

BACKGROUND OF THE INVENTION

The present invention relates to a container for high-grade natural products, a glass composition for such a container, and the use of this composition for a container for high-grade natural products.

Natural products, such as natural dietary supplements, phyto-therapeutic agents, etheric oils or homeopathic medicines, are high-grade products.

A problem in storing this type of high-grade products is that they are susceptible to decay, whereby the quality of this type of products decreases during storage.

According to a first aspect of the present invention a container is provided for high-grade natural products such as natural dietary supplements, phyto-therapeutic agents, etheric oils or homeopathic medicines, which container is formulated such that UV light can permeate in order to permit stimulating of the bio-energy of the products, and visible light substantially cannot permeate so as to prevent biological decomposition of the products.

A container according to the present invention thus provides full protection against the decay-causing frequencies of visible light and is on the other hand permeable in the violet and ultraviolet spectrum.

Sunlight consists on the one hand of the visible light spectrum (violet, blue, green, yellow, orange, red) and on the other of the invisible Ultraviolet- and Infrared spectrum. Sunlight is of enormous importance for the growth of all plants. No life is possible without light. When plants have been ripened in the sun, they are harvested and stored in a specific manner. If plants are exposed to further sunlight after the ripening process, a decomposition process can then begin. The same light which first enabled growth can now activate the molecular decomposition process and reduces the bio-energy.

In practice most agents (herbal tinctures and etheric oils amongst others) are packaged in standard brown glass or in plastic. Transmission measurements carried out by the inventors clearly show that brown glass permeates the visible light and thus does not provide sufficient protection (see FIG. 1). The same is seen in the case of green and blue glass, both permeate the whole light spectrum (see FIGS. 2 and 3). The different frequencies of visible light cause a kind of frequency chaos in the jar which enhances the decomposition process.

In contrast to glass, plastic jars are porous and allow through oxygen. The product quality is reduced by oxidation. They often also give off harmful gases (particularly at higher temperatures) which can destroy the subtle bio-energies.

In accordance with quantum physics, violet and ultraviolet (UV-A) light contain the highest energy charge of all spectral colours, the smaller the wavelength or the higher the frequency, the larger the energy quantum. Violet and UV-light not only have the smallest wavelength (and the highest frequency) of the light spectrum but are also the richest in energy. A unique high-energy environment is hereby created in the glass composition according to the present invention. The molecular structure of a substance is constantly stimulated and strengthened. The visible light is kept out, the decomposition process is slowed down considerably and the bio-energy in the container remains at the original level for a long time. A container according to the present invention hereby has a preserving capacity.

The glass composition according to the present invention appears black from the outside. A specific violet colour becomes visible when the glass is held to the light. The transmission curve clearly shows the difference between violet and black glass (FIGS. 4 and 5). Black glass prevents permeation of light in the visible spectrum from a determined thickness, but no longer allows permeation of energy-rich UV/violet light. No stimulation of the bio-energy therefore takes place.

DETAILED DESCRIPTION OF THE INVENTION

Experiment 1:

A series of tests was carried out to determine the optimal colour of violet.

The objective, for an average glass thickness of 4 mm, was as follows;

a) to achieve a permeability of a maximum of 40%–50% in the UV/violet spectrum between 320 nm–440 nm wavelength (nm=nanometer), b) to achieve a complete shielding in the visible part of the light spectrum between 450 nm–680 nm wavelength, c) to achieve a desired permeability of about 50%–60% in the Infrared-range between 700–1100 nm wavelength.

By means of transmission measurements it is possible to monitor precisely whether a glass mixture fulfils the objectives.

The required transmission curve was achieved by adding a number of metal oxides to the basic formula for clear glass, i.e., Cobalt oxide present in a weight percentage range of between 0.05 and 1.0%; Nickel oxide present in weight percentage range of between 0.05 and 1.0%; Manganese oxide present in a weight percentage range of between 0.5 and 1.5%; (in the form of MANGALOX); Chromium oxide present in a weight percentage range of between 0.01 and 1.5% (in the form of PORTACHROM) and Iron oxide present in a weight percentage range of between 0.01 and 1.5% (in the form of MANGALOX and PORTACHROM).

Because each oxide has a very specific influence on the transmission curve, the curve can be changed by altering the respective ratios. The final result can be seen in FIG. 4.

Glass formula:
Base for clear glass (per charge):
quartz sand=442.6 kg
dolomite=90.8 kg
soda=133.0 kg
calcium carbonate=46.0 kg
frit (1)=19.0 kg
Additives for the specific permeability/colour (per charge):
Cobalt oxide 2.2 kg
Nickel oxide 1.2 kg
MANGALOX (2)=6.5 kg
PORTACHROM=1.2 kg
(1) Frit; $Al_2O_3$, $Fe_2O_3$, $TiO_3$, CaO, MgO, $Na_2O$, KaO, $Na_2CO_3$.
(2) MANGALOX: $MnO_2$=79%, MnO=3%, $Fe_2O_3$=5.5%, $Al_2O_3$=3%, $SiO_2$=5%, $Na_2O$=0.1%, $K_2O$=0.7%, MgO=0.2% CaO=0.1%.
(3) PORTACHROM: $Cr_2O_3$=44%, FeO=24%, $SiO_2$=3.5%, $Al_2O_3$/$TiO_2$=15%, MgO=10%.

Figure 1:
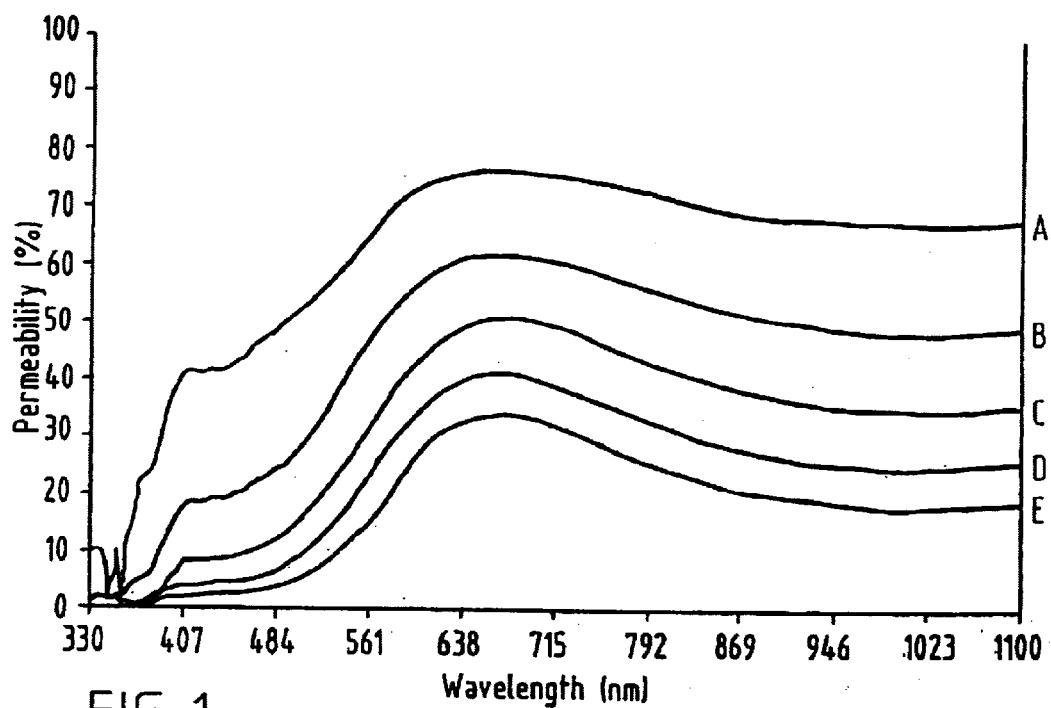
FIG. 1 is a graph showing wavelength versus permeability for brown glasses having thicknesses of 1 mm, 2 mm, 3 mm, 4 mm, and 5 mm.
Figure 2:
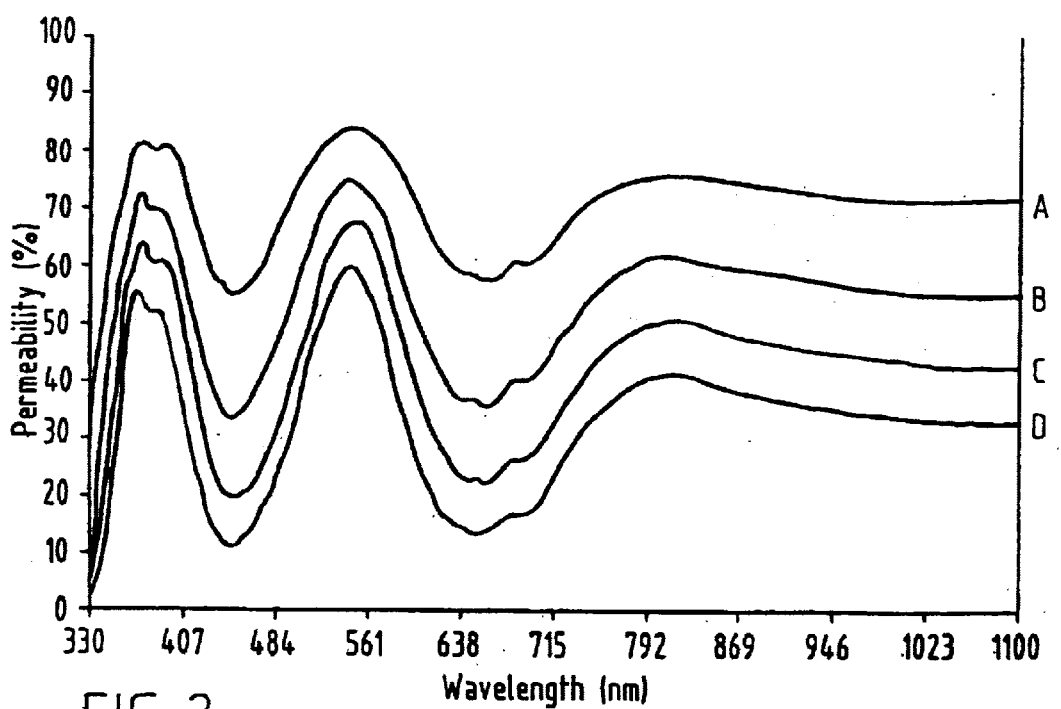
FIG. 2 is a graph showing wavelength versus permeability for green glasses having thicknesses of 1 mm, 2 mm, 3 mm, 4 mm, and 5 mm.
Figure 3:
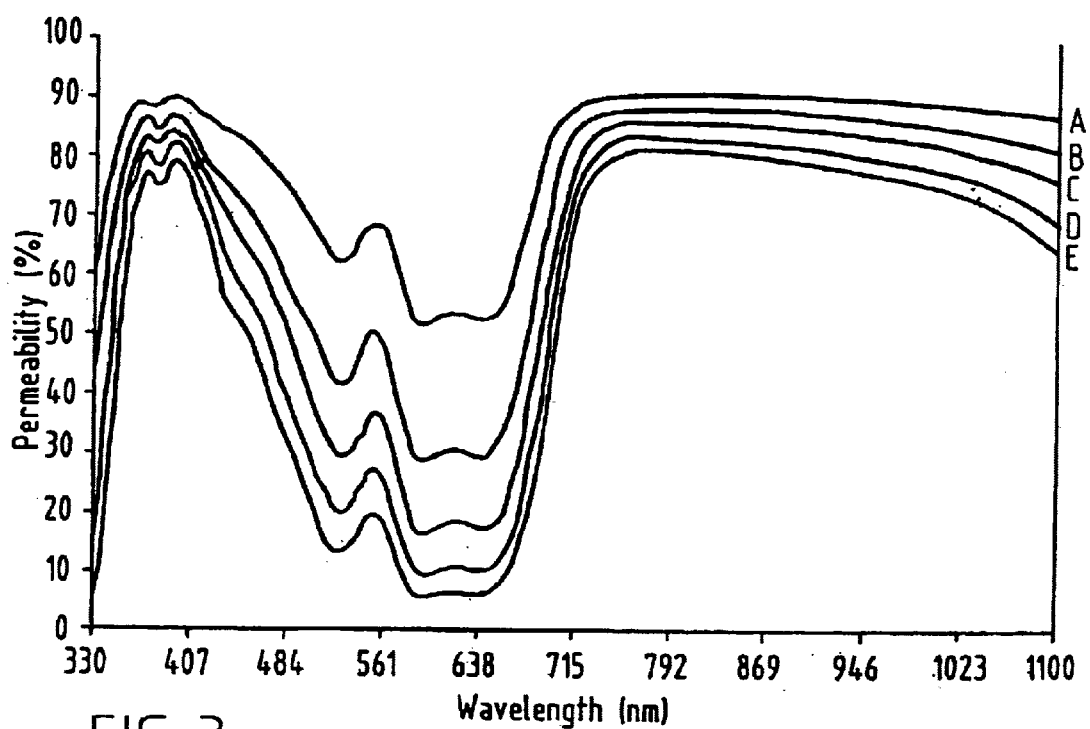
FIG. 3 is a graph showing wavelength versus permeability for blue glasses having thicknesses of 1 mm, 2 mm, 3 mm, 4 mm, and 5 mm.

FIGS. 1 to 5 show the permeability percentage of:
FIG. 1—brown glass with a thickness of: A-1 mm
B-2 mm
C-3 mm
D-4 mm
E-5 mm
FIG. 2—green glass with a thickness of: A-1 mm
B-2 mm
C-3 mm
D-4 mm
E-5 mm
FIG. 3—blue glass with a thickness of: A-1 mm
B-2 mm
C-3 mm
D-4 mm
E-5 mm
FIG. 4—violet glass according to the present invention with a thickness of: A-1 mm
B-2 mm
C-3 mm
D-4 mm
B-5 mm
FIG. 5—black glass with a thickness of: A-1 mm
B-2 mm
C-3 mm
D-4 mm
E-5 mm The advantages of the glass composition according to the present invention compared to normal glass:
optimal protection against light
natural bio-energetic preservation
bio-stimulation by energy-rich UV and violet light
quality retention over a long period of time
better market position relative to other suppliers
100% recyclable (green-glass container)

Experiment 2

Practical example with violet glass according to the present invention: Bio-photon research with Spirulina algae Research shows that the solar energy content in food is of great importance to health. Fresh vegetables and ripe fruit are for instance rich in solar energy. Via the food the stored solar energy finds its way in the form of bio-photons to our cells. Bio-photons are seen as information carriers which control complex processes in the cells. Bio-photon measurements, wherein ultra-weak light emissions of biological systems are measured, show that freshly harvested Spirulina algae contain a very high concentration of solar energy. This very sensitive bio-energy cannot however be stored for long. In a test fresh Spirulina algae were packed in different materials (violet glass according to the present invention, brown glass, aluminium foil and plastic) and kept for a number of weeks. The content of bio-photons was then measured, The violet glass according to the present invention showed by far the best results.

Bio-photon experiments on Spirulina

Materials and methods

Sample Collection

A Spirulina sample, in powder form and stored in plasticized aluminium foil (sample from Hawaii; control) was poured into 3 small storage containers of plastic, brown or violet glass according to the present invention (3 samples of 100 ml, about 60 g). A sample from California in brown glass was used as a further control. The sample was supplied by Spirulina International B.V. (Batch A1–A6).

A further Spirulina sample in powder form was poured directly into a violet glass and into bags of plasticized aluminium foil in Hawaii (Batch B1–B2) and the sample stored in bags of aluminium foil was taken to Tilburg, Netherlands, in 3 small storage containers of plastic, brown or violet glass (3 samples of 100 ml, about 60 g) (Batch B3–B5). Further comparative samples from California in plastic, brown or violet glass according to the present invention and in aluminium served as additional controls (Batch C1–C4). These were supplied by Spirulina International B.V.

An additional Spirulina sample, in powder form, was poured directly into 4 different storage materials of aluminium, violet glass, plastic and brown glass (D1–D4) at Cyanotech on Hawaii. A further, final Spirulina sample in powder form (violet glass) was made available.

Quantity

The Spirulina samples were measured in a quartz sample glass (2.2 cm×2.2 cm×3.6 cm), wherein the capacity of this sample glass is 15 ml.

Test Structure

Photon Measurement in the Laboratory of Fritz-Albert Popp

The selected substances were measured a number of times using the ultra-weak photon apparatus of Fritz-Albert Popp of the Kaiseralautern Centre of Technology. In this case the Spirulina samples were measured directly in powder form; Spirulina samples of 300 mg were dissolved in 15 ml of cell culture medium (DMEM) and 10 ml of this solution was used for the measurement. The energy content of the solid samples and the solutions was determined as follows: The sample poured into a quartz sample glass was tested for its intrinsic emission (UL) and for the photon radiation after excitation with monochromatic light (300–700 nm) (PDL) and white light. The excitation time was 30 seconds. The interval in the measurements for recording the photon intensity after excitation with white light was always 40 ms.

Development to Photon Measurement in Time in the Laboratory of Fritz-Albert Popp The selected samples were measured twice—3 times within a month. The solid samples and the Spirulina samples measured in DMEM were measured immediately after preparation and 2 hours later on each measuring day. The Spirulina sample for determining the light absorption capacity in the cell culture medium DMEM was measured after excitation with monochromatic light in the wavelength range 360–600 nm.

Results and Discussion

Figure 6:
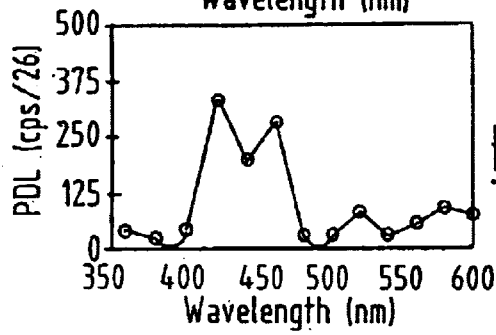
FIG. 6 is a graph showing the induced emission (PDL) of the ultra-weak photon emission in the wavelength range 360–600 nm in an untreated Spirulina sample.

Photon Intensity of Spirulina After Excitation With Monochromatic Light Between 360–600 nm for Determining the Light Absorption Capacity FIG. 6 shows the induced emission (PDL) of the ultra-weak photon emission in the wavelength range 360–600 nm in an untreated Spirulina sample, which was dissolved in the cell culture medium DMEM. The initial intensity of the ultra-weak photon radiation after monochromatic radiation was measured.

It was possible to excite the Spirulina dissolved in the cell culture medium over the whole measured wavelength range, which indicates that Spirulina is capable of absorbing practically all sunlight. The Spirulina dissolved in the cell culture medium can be very strongly excited in the UVA-range and the violet-blue range (360–460 nm), in fact in precisely that wavelength range which performs an important communication task in human cells. This experiment demonstrates that Spirulina is an outstanding natural solar photon storing substance.

The Storage Quality of Spirulina in Different Materials

Spirulina powder from Hawaii (A1–A5; H) and from California (A6; C) in batch A were stored for two months in different materials, and the storage quality was determined by means of ultra-weak photon radiation, as shown in FIG. 7.

Figure 7:
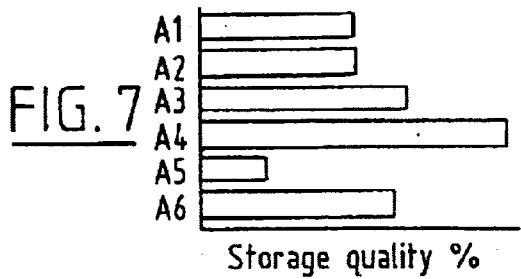
FIG. 7 is a graph showing the storage quality of Spirulina in the inventive violet glass (A4)>plastic (A3)>brown glass (A2)>aluminum (A1).

The results shown in FIG. 7 show clearly that the Spirulina sample from Hawaii which was stored in violet glass has the best storage quality. The storage quality of the tested materials is shown in the following order: violet glass (A4)>plastic (A3)>brown glass (A2)>aluminium (A1).

The Spirulina reference in California (A6), which was stored in brown glass, is comparable to the storage quality of the Spirulina sample from Hawaii, which was stored in plastic. The significantly lowest storage quality, which was found in the Spirulina sample which was stored in aluminium for 6 months, is most probably the consequence of the prolonged storage in this material. The results shown here indicate that violet glass according to the present invention had a storage quality which is a factor of two better, and this confirmed the results which were found with the sunlight globuli which were stored in violet glass.

Figure 8:
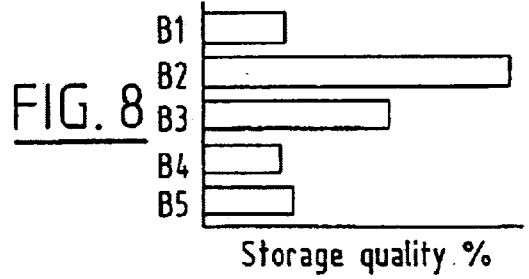
FIG. 8 is a graph showing the storage quality of Spirulina in the inventive violet glass (B2; B3)>plastic (B5) aluminum (B1)>brown glass (B4).

FIG. 8 shows the results of the Spirulina samples from Hawaii, which were tested in batch B. Spirulina powder was poured into plasticized aluminium foil (B1) or into violet glass immediately after spray-drying in Hawaii. Two weeks later the Spirulina stored in aluminium foil was transferred to violet glass, brown glass and plastic. A significant reduction in quality was observed in the Spirulina sample stored in aluminium. This reduction was the result of either the transport in the aircraft (cosmic radiation) or of the X-rays used by customs to screen luggage and passengers. The best storage quality was found in the Spirulina sample which was stored in violet glass and which was poured therein immediately after spray-drying (B2). The Spirulina sample (B3) which was transferred to violet glass after transport recovered best from the transport shock of the Spirulina samples stored in aluminium. The storage quality was reduced in this experiment in the following sequence: violet glass (B2; B3)>plastic (B5)>aluminium (B1)>brown glass (B4).

Figure 4:
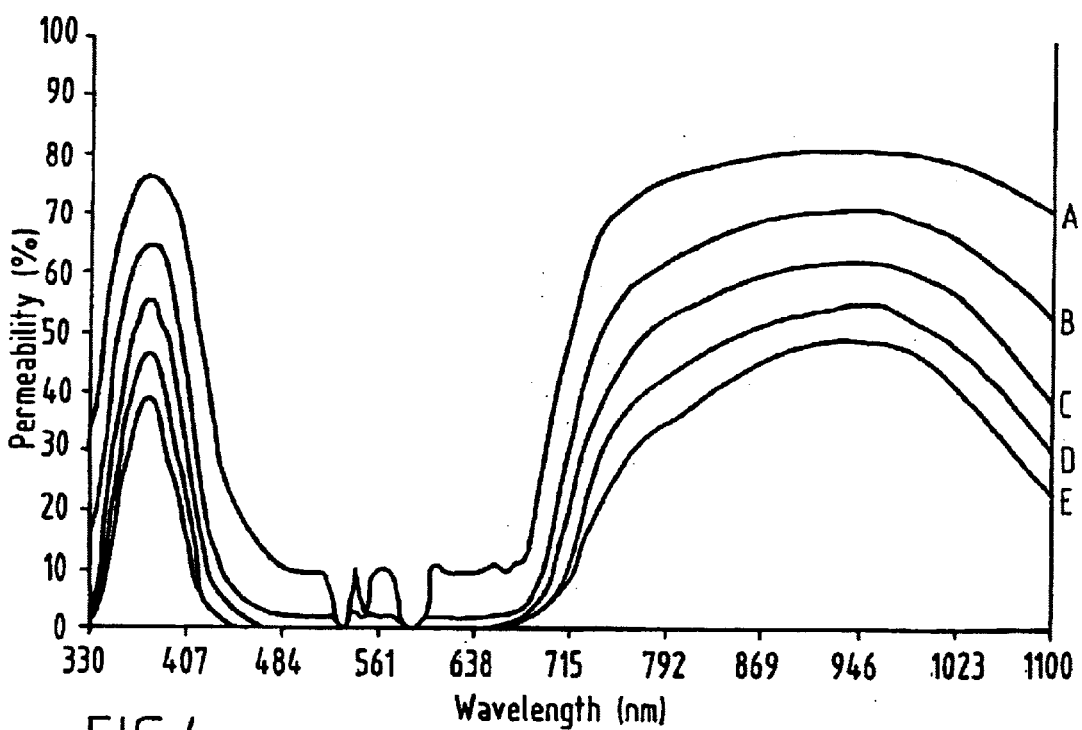
FIG. 4 is a graph showing wavelength versus permeability for violet glasses according to the present invention having thicknesses of 1 mm, 2 mm, 3 mm, 4 mm, and 5 mm.
Figure 5:
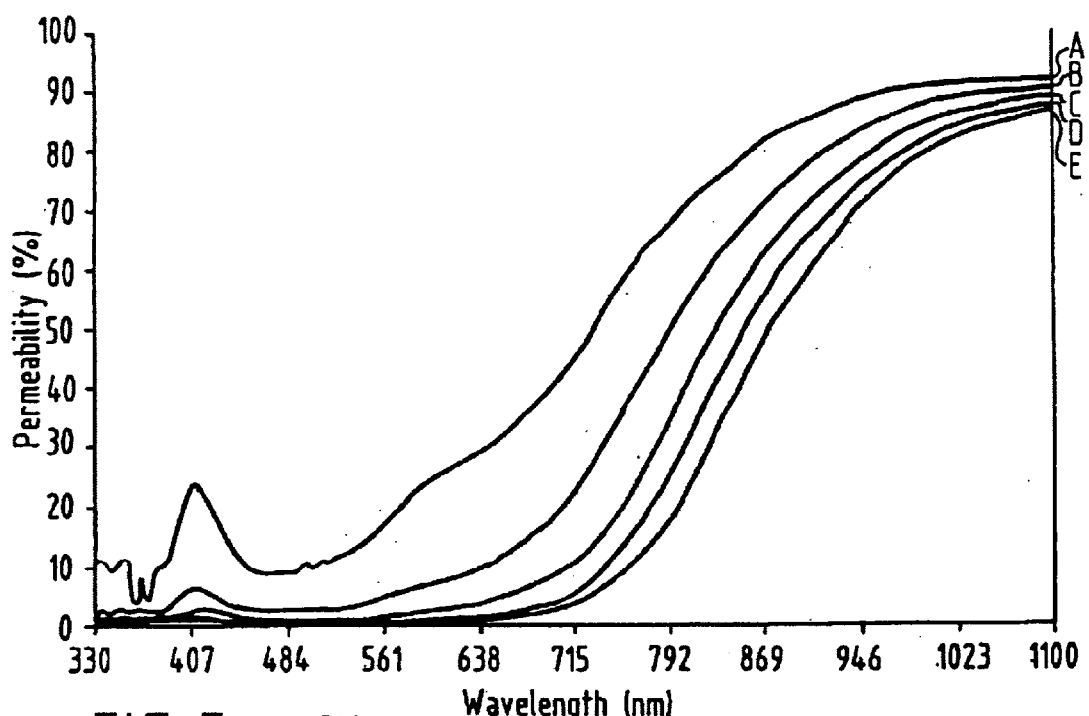
FIG. 5 is a graph showing wavelength versus permeability for black glasses having thicknesses of 1 mm, 2 mm, 3 mm, 4 mm, and 5 mm.
Figure 9:
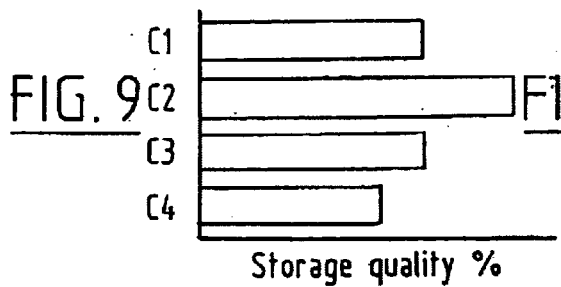
FIG. 9 is a graph showing the storage quality of DIG-powder in the inventive violet glass (C2)>brown glass (C3)>aluminum (C1)>plastic (C4).

Further bio-photon experiments were performed on DIC-powder from Califonia (C). FIG. 9 shows the storage qualities of these different samples in Batch C. As shown in FIG. 4, the best storage quality was here also achieved with violet glass (C2) as the material for Spirulina powder from California. The storage quality was reduced in the following order: violet glass (C2)>brown glass (C3)>aluminium (C1) >plastic (C4).

Figure 10:
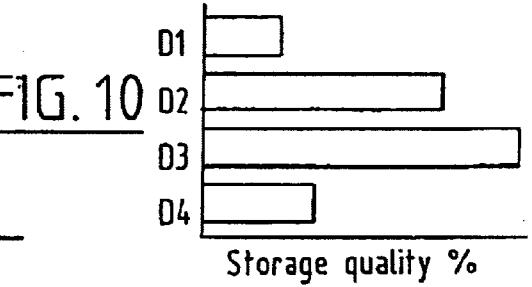
FIG. 10 is a graph showing the storage quality of Spirulina in the inventive violet glass (D3)>violet foil (D2) >transparent foil (D4)>aluminum (D1).

In a further storage experiment in batch D on Spirulina powder from Hawaii, violet glass according to the present invention was compared to a newly developed foil of violet glass, the usual transparent foil and the reference aluminium (see FIG. 10).

The storage quality decreased in the following sequence: Violet glass (D3)>violet foil (D2)>transparent foil (D4) >aluminium (D1). The new experiments confirm the findings of previous experiments, i.e. that storage in violet glass according to the invention significantly increases the quality of the Spirulina samples. It has also been found that the newly developed violet foil (D2) has a very good storage quality, although this quality does not reach the same level as that of violet glass according to the present invention (D3). The violet foil (D2) is however much better than the usual materials such as transparent foil (D4) or aluminium (D1). It therefore forms an excellent unbreakable alternative for the transport of Spirulina samples.

The present invention is not limited to the above description; the rights sought are rather defined by the following claims.

What is claimed is:

1. A glass composition comprising aluminum oxide, silicon oxide, sodium oxide, potassium oxide, magnesium oxide, calcium oxide, cobalt oxide, nickel oxide, manganese oxide, chromium oxide and iron oxide, wherein said glass completely shields visible light between 450 nm to 680 nm wavelength when said glass is at least 2 mm in thickness, and further wherein said glass is permeable to light having wavelengths in both the ultraviolet and infrared ranges.

2. A glass composition comprising aluminum oxide, silicon oxide, sodium oxide, potassium oxide, magnesium oxide, calcium oxide, cobalt oxide, nickel oxide, manganese oxide, chromium oxide and iron oxide, wherein said glass completely shields visible light between 450 nm to 680 nm wavelength when said glass is at least 2 mm in thickness, wherein said glass has a permeability of a maximum of 40% to 50% in the ultraviolet spectrum between 320 nm to 440 nm wavelength when said glass is at least 4 mm in thickness, and has a permeability of about 50% to 60% in the infrared range between about 700 rim to 1100 nm wavelength when said glass is at least 4 mm in thickness.

3. The glass composition according to claim 1, wherein cobalt oxide is present in a weight percentage range of between 0.05 and 5.0%.

4. The composition according to claim 1, wherein nickel oxide is present in a weight percentage range of between 0.05 and 5.0%.

5. The composition according to claim 1, wherein manganese oxide and iron oxide are present in a weight percentage range of between 0.05 and 5.0%.

6. The composition according to claim 1, wherein chromium oxide and iron oxide are present in a weight percentage range of between 0.01 and 5.0%.

7. The composition according to claim 1, wherein cobalt oxide is present in a weight percentage range of between 0.05 and 1.0%; nickel oxide is present in a weight percentage range of between 0.05 and 1.0%; manganese oxide and iron oxide are present in a weight percentage range of between 0.5 and 1.5%; and chromium oxide and iron oxide are present in a weight percentage range of between 0.01 and 1.5%.

8. The composition according to claim 1, wherein cobalt oxide is present in a weight percentage range of between 0.1 and 0.5%; nickel oxide is present in a weight percentage range of between 0.1 and 0.5%; manganese oxide and iron oxide are present in a weight percentage range of between 0.7 and 1.3%; and chromium oxide and iron oxide are present in a weight percentage range of between 0.1 and 1.0%.

9. The composition according to claim 8, wherein cobalt oxide is present in a weight percentage of about 0.36% and nickel oxide is present in a weight percentage of 0.24%.

10. A container made from a composition as claimed in claim 1.

* * * * *

UNITED STATES PATENT AND TRADEMARK OFFICE
CERTIFICATE OF CORRECTION

PATENT NO. : 6,670,292 B2
DATED : December 30, 2003
INVENTOR(S) : Marcus Rohrer et al.

It is certified that error appears in the above-identified patent and that said Letters Patent is hereby corrected as shown below:

Column 2,
Line 38, in FIG. 9, "DIG" should read -- DIC --.

Column 3,
Line 18, "Cobalt oxide 2.2 kg" should read -- Cobalt oxide = 2.2 kg --.
Line 19, "Nickel oxide 1.2 kg" should read -- Nickel oxide = 1.2 kg --.

Column 6,
Line 46, "700 rim" should read -- 700 nm --.

Signed and Sealed this

Fifteenth Day of June, 2004

JON W. DUDAS
*Acting Director of the United States Patent and Trademark Office*